US012739572B2

(12) United States Patent
Zou

(10) Patent No.: US 12,739,572 B2
(45) Date of Patent: *Sep. 15, 2026

(54) MEMS MICROPHONE AND ELECTRONIC DEVICE

(71) Applicant: Goertek Microelectronics Inc., Qingdao (CN)

(72) Inventor: Quanbo Zou, Shandong (CN)

(73) Assignee: Goertek Microelectronics Inc., Qingdao (CN)

(*) Notice: Subject to any disclaimer, the term of this patent is extended or adjusted under 35 U.S.C. 154(b) by 62 days.

This patent is subject to a terminal disclaimer.

(21) Appl. No.: 18/852,992

(22) PCT Filed: Mar. 27, 2023

(86) PCT No.: PCT/CN2023/084079

§ 371 (c)(1),
(2) Date: Sep. 30, 2024

(87) PCT Pub. No.: WO2023/185736

PCT Pub. Date: Oct. 5, 2023

(65) Prior Publication Data

US 2025/0220359 A1 Jul. 3, 2025

(30) Foreign Application Priority Data

Mar. 31, 2022 (CN) ........................ 202210344630.5

(51) Int. Cl.

*H04R 19/04* (2006.01)
*H04R 1/28* (2006.01)
*H04R 7/12* (2006.01)

(52) U.S. Cl.

CPC ........... *H04R 19/04* (2013.01); *H04R 1/2807* (2013.01); *H04R 7/122* (2013.01); *H04R 2201/003* (2013.01); *H04R 2201/029* (2013.01); *H04R 2410/03* (2013.01)

(58) Field of Classification Search

CPC ...... H04R 19/04; H04R 1/2807; H04R 7/122; H04R 2201/003; H04R 2201/029; H04R 2410/03; H04R 31/003; H04R 19/005; H04R 7/02

See application file for complete search history.

(56) References Cited

U.S. PATENT DOCUMENTS

2014/0133685 A1 5/2014 Liu et al.

FOREIGN PATENT DOCUMENTS

CN 206341349 U 7/2017
CN 210609708 U 5/2020
CN 213694056 U 7/2021

*Primary Examiner* — Tuan D Nguyen

(74) *Attorney, Agent, or Firm* — Baker Botts LLP

(57) ABSTRACT

Disclosed are a MEMS microphone and an electronic device. The MEMS microphone comprises a substrate, a diaphragm, and a backplate. The backplate is formed with a support, and comprises a first back-electrode region and a second back-electrode region which are connected to different electrodes.

16 Claims, 3 Drawing Sheets

MEMS MICROPHONE AND ELECTRONIC DEVICE

CROSS-REFERENCE TO RELATED APPLICATIONS

The present disclosure is a National Stage of International Application No. PCT/CN2023/084079 filed on Mar. 27, 2023, which claims priority to a Chinese patent application No. 202210344630.5 filed with the CNIPA on Mar. 31, 2022 and entitled "MEMS MICROPHONE AND ELECTRONIC DEVICE", both of which are hereby incorporated by reference in their entireties.

TECHNICAL FIELD

The present disclosure relates to a MEMS (Micro-Electro-Mechanical System) microphone and an electronic device.

BACKGROUND

In available MEMS (Micro-Electro-Mechanical System) microphone products, differential capacitive MEMS products have occupied a significant market share due to their superior performance in Total Harmonic Distortion (THD) and Acoustic Overload Point (AOP). However, common differential structures all adopt a three-layer symmetric structure that requires the addition of a layer of diaphragm or backplate, leading to quite complex manufacturing processes, high chip costs, low yield rates, poor reliability, and other issues.

Therefore, it is necessary to provide a new type of MEMS microphone and electronic device.

SUMMARY

In view of the above disadvantages in the prior art, an object of the present disclosure is to provide a new type of MEMS microphone and electronic device, aiming to solve at least one of the problems in the prior art.

According to an aspect of the present disclosure, a MEMS (Micro-Electro-Mechanical System) microphone is provided, comprising: a substrate, on which an acoustic cavity is formed;

- a diaphragm having a fixed part which is fixed on the substrate, and a suspended part which is located above the acoustic cavity;
- a backplate provided on the substrate, forming a gap with the diaphragm and provided with a support distributed annularly thereon, and the support extending toward the diaphragm, corresponding to a position of the suspended part and dividing the suspended part into an inner suspended region and an outer suspended region;
- when the backplate and/or the diaphragm is energized, the suspended part is configured for being able to abut against the support such that the inner suspended region is capable of being excited by sound pressure to vibrate mechanically, and the inner suspended region surrounds the support to drive the outer suspended region to vibrate, wherein a vibration direction of the inner suspended region is opposite to that of the outer suspended region;
- the diaphragm and the backplate form a capacitive structure which is divided into an inner capacitor and an outer capacitor by the support.

Optionally, the inner capacitor and the outer capacitor have matched capacitance values.

Optionally, a difference between absolute values of capacitance values of the inner capacitor and the outer capacitor is less than or equal to 15%.

Optionally, the outer suspended region is provided with a plurality of damping holes.

Optionally, the plurality of damping holes are centrally symmetrically distributed with respect to a center of the outer suspended region.

Optionally, the damping holes are arranged in one or more circles.

Optionally, the diaphragm is configured to be connected to a bias voltage terminal;

- a first back-electrode region is configured to be connected to a first potential point, a second back-electrode region is configured to be connected to a second potential point, the first potential point and the second potential point having the same absolute value of potential, and the inner suspended region having a mechanical sensitivity and a critical voltage that are correspondingly matched to those of the outer suspended region.

Optionally, a difference between a mechanical sensitivity of the inner suspended region and that of the outer suspended region is less than or equal to 15%; and

- a difference between a critical voltage of the inner suspended region and that of the outer suspended region is less than or equal to 15%.

Optionally, when the backplate and/or the diaphragm is energized, the suspended part is spaced apart from the substrate by at least 2 μm in a vibration direction of the suspended part.

Optionally, the support is a continuous annular structure; or, the support comprises a plurality of protrusions distributed at intervals.

Optionally, the support comprises a plurality of protrusions, which are centrally symmetrically distributed with respect to a center of the suspended part.

Optionally, the inner suspended region and the outer suspended region are circular in shape with radial dimensions thereof being a diameters.

Optionally, the inner suspended region has a diameter ranging from 450 μm to 750 μm;

- the outer suspended region has a diameter ranging from 650 μm to 1100 μm; and
- the diaphragm has a thickness ranging from 0.75 μm to 1.25 μm.

Optionally, the inner suspended region has a diameter of 500 μm;

the outer suspended region has a diameter of 750 μm; and the diaphragm has a thickness of 1 μm.

According to another aspect of the present disclosure, a MEMS microphone is provided, comprising:

- a substrate, on which an acoustic cavity is formed;
- a backplate provided on the substrate and provided with a protruding support distributed annularly thereon;
- a diaphragm having a fixed part which is fixed on the substrate, and a suspended part, the backplate forming a gap with the diaphragm, and the support dividing the suspended part into an inner suspended region located above a sound input channel and an outer suspended region located outside the sound input channel;
- when the backplate and/or the diaphragm is energized, the suspended part is configured for being able to abut against the support such that the inner suspended region is capable of being excited by sound pressure to vibrate mechanically.

According to yet another aspect of the present disclosure, an electronic device is provided, comprising the above MEMS microphone. The MEMS microphone is configured for converting, in operation, a sound signal into an electrical signal.

A technical effect of the embodiment of the present disclosure is that by creatively using the support to divide the backplate into the first back-electrode region and the second back-electrode region and connecting the first back-electrode region and the second back-electrode region to different electrodes so as to generate a differential capacitor without adding an additional structure, it is possible to increase area of the diaphragm while ensuring frequency bandwidth of the product, reduce noise, and improve the signal-to-noise ratio, thus enhancing the overall performance of the microphone product.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which constitute a part of the description, illustrate embodiments of the present disclosure and, together with the description thereof, serve to explain the principles of the present disclosure.

DESCRIPTION OF REFERENCE SIGNS

Figure 1:
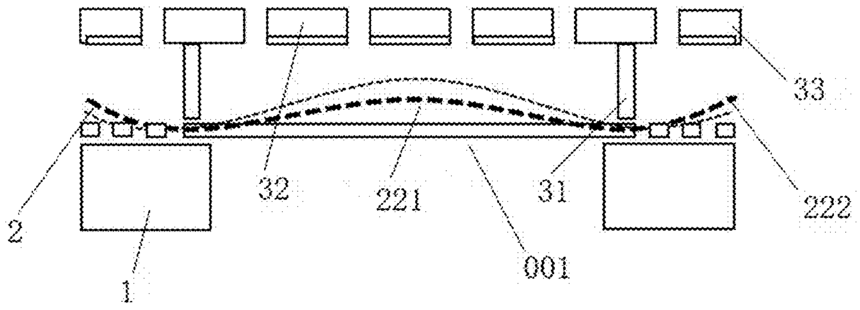
FIG. 1 is a simplified structural diagram of a MEMS microphone according to an embodiment of the present disclosure.

1. substrate; 2. diaphragm; 3. backplate; 31. support; 32. first back-electrode region; 33. second back-electrode region; 001. acoustic cavity; 21. fixed part; 22. suspended part; 221. inner suspended region; 222. outer suspended region; 2221. damping hole; 311. protrusion; 312. reinforcing layer; 4. welding point; H. distance between the substrate and the diaphragm.

DETAILED DESCRIPTION

Various exemplary embodiments of the present disclosure will now be described in detail with reference to the accompanying drawings. It is to be noted that unless otherwise specified, the scope of present disclosure is not limited to relative arrangements, numerical expressions and values of components and steps as illustrated in the embodiments.

Description to at least one exemplary embodiment is for illustrative purpose only, and in no way implies any restriction on the present disclosure or application or use thereof.

Techniques, methods and devices known to those skilled in the prior art may not be discussed in detail; however, such techniques, methods and devices shall be regarded as part of the description where appropriate.

In all the examples illustrated and discussed herein, any specific value shall be interpreted as illustrative rather than restrictive. Different values may be available for alternative examples of the exemplary embodiments.

It is to be noted that similar reference numbers and alphabetical letters represent similar items in the accompanying drawings. In the case that a certain item is identified in a drawing, further reference thereof may be omitted in the subsequent drawings.

The present disclosure provides a MEMS microphone. The MEMS microphone is a microphone manufactured using MEMS technology. Simply put, the MEMS microphone utilize semiconductor material to form capacitors and integrate these capacitors onto micro silicon wafers. The MEMS microphone formed through the MEMS process is characterized by its small size and high sensitivity, and also possesses excellent radio frequency interference (RFI) and electromagnetic interference (EMI) suppression capabilities. The MEMS microphone is commonly used in mid-to-high-end smartphones and other electronic devices.

The MEMS microphone provided by the present disclosure comprises: a substrate 1, a diaphragm 2 an a backplate 3. Wherein, an acoustic cavity 001 is formed on the substrate 1. The diaphragm 2 is has a fixed part 21 which is fixed on the substrate 1, and a suspended part 22 which is located above the acoustic cavity 001. The backplate 3 is provided on the substrate 1, forms a gap with the diaphragm 2, and is provided with a support 31 distributed annularly thereon. The support 31 extends toward the diaphragm 2, corresponds to a position of the suspended part 22, and divides the suspended part 22 into an inner suspended region 221 and an outer suspended region 222. When the backplate 3 and/or the diaphragm 2 is energized, the suspended part 22 is configured for being able to abut against the support 31 such that the inner suspended region 221 is capable of being excited by sound pressure to vibrate mechanically, and the inner suspended region 221 surrounds the support 31 to drive the outer suspended region 222 to vibrate, wherein a vibration direction of the inner suspended region 221 is opposite to that of the outer suspended region 222.

Figure 4:
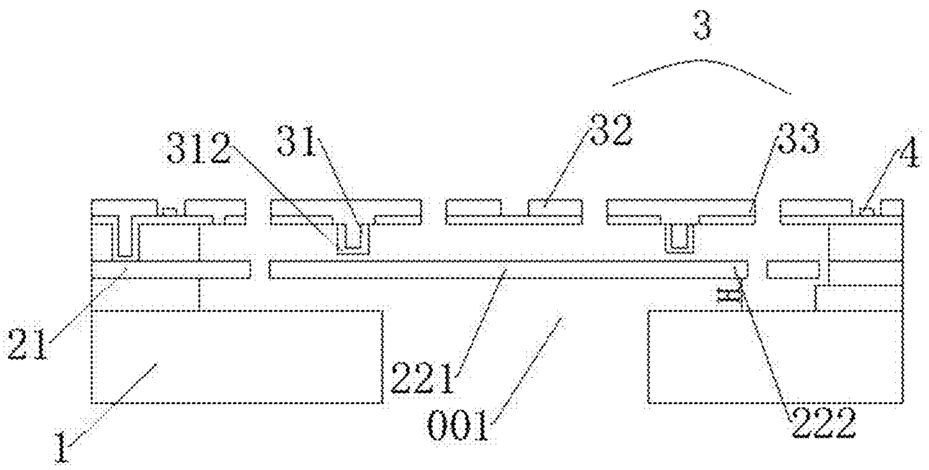
FIG. 4 is a schematic structural diagram of a MEMS microphone according to an embodiment of the present disclosure.

As shown in FIGS. 1 and 4, the substrate 1 forms an acoustic cavity 001 for accommodating structures for transmitting sound. The diaphragm 2 may be divided into the fixed part 21 and the suspended part 22 based on its connection to the substrate 1; wherein the fixed part 21 is fixed to the substrate 1, while the suspended part 22 is located over the acoustic cavity 001. That is to say, the fixed part 21 is centrally located and can vibrate; the fixed part 21 is located around it and cannot vibrate.

In one form, an edge region of the diaphragm 2 which is a part thereof serves as the fixed part 21, while the rest of the entire diaphragm 2 serves as the suspended part 22. The region of the suspended part 22 distal to the fixed part 21 may be laid on the substrate 1 or on the edge of the acoustic cavity 001.

The backplate 3 is provided on the substrate 1 and is opposite to the diaphragm 2. The backplate 3 and diaphragm 2 form a gap between them, and they constitute a capacitor together with the gap.

Figure 2:
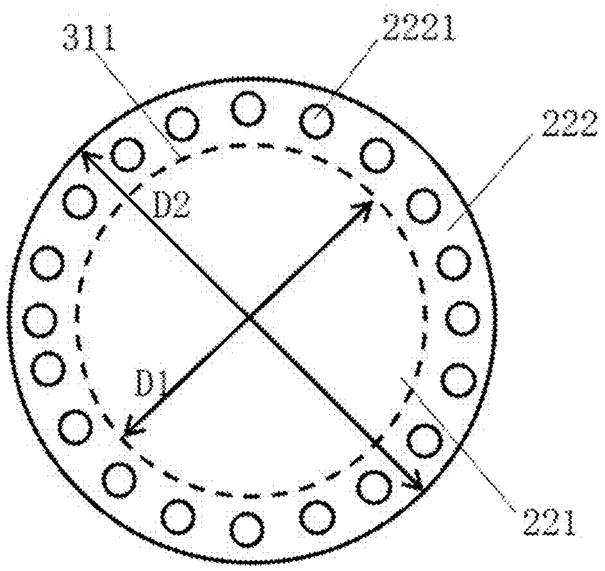
FIG. 2 is a top view of a MEMS microphone according to an embodiment of the present disclosure.

As shown in FIG. 2, the backplate 3 is provided with the support 31 distributed annularly thereon. The support 31 may be protrusions 311 formed on the backplate 3. The support 31 extends toward the diaphragm 2 and corresponds to a position of the suspended part 22. As shown in FIG. 2, the support 31 does not surround the suspended part 22; rather, it is distributed within the internal region of the suspended part 22 when viewed from a projection perspective. The support 31 divides the suspended part 22 into an inner suspended region 221 and an outer suspended region 222. According to the annular distribution of the support 31, along the radial direction of the diaphragm 2, a part of the suspended part 22 surrounded by the support 31 is the inner suspended region 221, and a part of the suspended part 22 outside the support 31 is the outer suspended region 222. Under the simple supporting effect of the support 31, the inner suspension region 221 may vibrate in response to the vibration of sound and air.

Optionally, the annularly distributed support 31 is intended to divide the diaphragm 2 into the inner suspended region 221 and the outer suspended region 222. In the present disclosure, the annularly distributed support 31 may be arranged in a circular, rectangular, or elliptical pattern. Furthermore, for the structure of the support 31 itself, one can choose a combination of multiple protrusions to form the annularly distributed structure, or one can choose a substantially complete annular protrusion 311.

When sound pressure acts on the diaphragm 2, the diaphragm 2 vibrates as a result, thereby changing the capacitance between the diaphragm 2 and the backplate 3. Wherein, the gap between the backplate 3 and the diaphragm 2 may be an air gap or a gap composed of other media.

In the case where the backplate 3 or the diaphragm 2 is energized, or both the backplate 3 and the diaphragm 2 are energized, the suspended part 22 may be pushed toward the backplate 3 under electromagnetic force, so as to abut against the support 31. Wherein, abutment may refer to abutting or connecting between the two. Moreover, the inner suspended region 221 is excited by the sound pressure to generate mechanical vibration and thus changes the output voltage of the capacitor, such that the electronic device employing it converts a sound signal into an electrical signal.

In this technical solution, the diaphragm 2 may exhibit two types of vibration effects through the cooperation of the inner suspended region 221, the outer suspended region 222, and the support 31. That is, when the inner suspended region 221 is subjected to sound pressure and produces mechanical vibrations, the inner suspended region 221 may surround the support 31 to drive the outer suspended region 222 to vibrate, wherein a vibration direction of the inner suspended region 221 is opposite to that of the outer suspended region 222. Typically, the inner suspended region 221 may be subjected to sound pressure directly, and under the simple support, the deformation action of the inner suspended region 221 is transmitted to the outer suspended region 222. The outer suspended region 222 will experience a "seesaw effect" and produce deformation opposite to that of the inner suspended region 221.

Furthermore, as shown in FIG. 1, utilizing the characteristics of the diaphragm 2, the backplate 3 may comprise a first back-electrode region 32 and a second back-electrode region 33. The first back-electrode region 32 corresponds to the position of the inner suspended region 221 and the second back-electrode region 33 corresponds to the position of the outer suspended region 222.

The diaphragm 2 and the backplate 3 form a capacitive structure, and the support 31 divides the capacitive structure into an inner capacitor and an outer capacitor. The inner capacitor is formed by the inner suspended region 221 and the first back-electrode region 32, while the outer capacitor is formed by the outer suspended region 222 and the second back-electrode region 33. With this design, the inner suspended region 221 and the outer suspended region 222 exhibit related vibration characteristics, and the inner capacitor and the outer capacitor may acts as differential capacitors to achieve better acoustic performance.

Optionally, the first back-electrode region 32 and the second back-electrode region 33 may be connected to different electrodes respectively to form the inner capacitor and the outer capacitor, with different connection points for electrodes of the two capacitors. This design approach is easy to implement and is not likely to affect the structure of the diaphragm 2 and the backplate 3. In other implementations, the inner suspended region 221 and the outer suspended region 222 may also be connected to different electrodes to form the inner capacitor and the outer capacitor.

The present disclosure provides the stress-free film support 31 between the edge and the center of the diaphragm 2 and connects the first back-electrode region 32 and the second back-electrode region 33 of the backplate 3 to different electrodes. In this way, the first back-electrode region 32 and the inner suspended region 221 may form one set of capacitive structures, while the second back-electrode region 33 and the outer suspended region 222 may form another set of capacitive structures. This technical solution may form two sets of capacitive structures under the condition of a single diaphragm and a single backplate, and the outer suspended region 222 and the inner suspended region 221 deform in opposite directions, thus forming a differential capacitor. This technical solution may form the differential capacitor using the single diaphragm and the single backplate, which avoids increasing the number of diaphragm 2 or back plate 3, reduces the difficulty of processing technology, and also reduces production cost. By optimizing the design dimensions such that the inner suspended region 221 and the outer suspended region 222 have similar or identical mechanical sensitivity Sm and critical voltage Vp, the backplate may be connected to the two input ends of the differential amplifier respectively during operation.

In practical applications, for example, positive sound pressure causes the inner suspended region 221 to move toward the backplate 3, so as to generate an electrical signal Vo−. The outer suspended region 222 moves away from the backplate 3 (i.e., seesaw effect) to generate an electrical signal Vo+, and forms a differential signal together with the inner suspended region 221. By optimizing the ratio of sizes of the inner suspended region 221 and the outer suspended region 222 such that Vo−=−Vo+, it is possible to improve the acoustic performance of the MEMS microphone.

A technical effect of the embodiment of the present disclosure is that by using the support 31 to divide the backplate 3 into the first back-electrode region 31 and the second back-electrode region 32 and connecting the first back-electrode region 31 and the second back-electrode region 32 to different electrodes so as to generate a differential capacitor without adding an additional structure, it is possible to increase area of the diaphragm 2 while ensuring frequency bandwidth of the product, reduce noise, and improve the signal-to-noise ratio, thus enhancing the overall performance of the microphone product.

Optionally, the diaphragm 2 is configured to be connectable to a bias voltage terminal. Meanwhile, the first back-electrode region 32 and the second back-electrode region 33 may be connected to a first potential point and a second potential point, respectively. In actual applications, the first potential point and the second potential point may be loaded with potentials of the same value via a circuit. The direction of these two potential points may be the same. In this way, after applying a bias voltage to the diaphragm 2, the diaphragm 2 will be pushed toward the backplate 3 under electromagnetic forces and supported by the support 31. When the inner suspended region 221 and the outer suspended region 222 vibrate in opposite directions, the inner suspended region 221 and the first back-electrode region 32 form the inner capacitor, while the outer suspended region 222 and the second back-electrode region 33 form the outer capacitor, with the changing trends for the two capacitors being opposite. This technical solution may form a differential capacitor with good performance and stability. Optionally, the first potential point and the second potential point may be grounded to obtain the same potential value, or may be loaded with a potential via an external circuit of the MEMS microphone.

In the technical solution shown in FIGS. 1 and 4, the inner suspended region 221 is positioned above the acoustic cavity 001 formed on the substrate 1, while the outer suspended region 222 is positioned above the substrate 1. To some extent, the substrate 1 affects the vibration performance of the outer suspended region 222. If the substrate 1 is too close to the outer suspended region 222, the outer suspended region 222 will encounter air resistance when vibrating, preventing it from forming a good responsive vibration to vibration of the sound.

Optionally, for the inner capacitor and the outer capacitor, the capacitance values of them may be relatively matched and are close to each other. In this way, a more stable and easily identifiable differential capacitor may be formed. Optionally, a difference between absolute values of capacitance values of the inner capacitor and the outer capacitor is less than or equal to 15%. When the capacitance values of the inner and outer capacitors meet the aforementioned characteristics, the vibration effect expressed by the diaphragm 2 in the MEMS microphone allows it to better form the differential capacitors, thereby improving the overall acoustic performance. The difference between absolute values of capacitance values of the inner capacitor and the outer capacitor is less than 10%, close to 5% and below 5%, and therefore the absolute values of the capacitance values are the same. In this way, it is possible to ensure the higher accuracy of differential capacitance and differential signal, which is less likely to cause distortion and error in sound signals.

Furthermore, it is also possible to amplify the capacitance signal of the differential capacitor so as to enhance the sound recognition of the sound signal itself. By amplifying the signal of the differential capacitor, it is possible to further reduce the difference between the inner and outer capacitors, thereby improving precision.

For this reason, optionally, the outer suspended region 222 is provided with a plurality of damping holes 2221. By providing the plurality of damping holes 2221 on the outer suspended region 222, it is possible to reduce the vibration damping of the outer suspended region 222. These damping holes 2221 may release the air between the outer suspended region 222 and the substrate 1, thereby reducing the impact of air resistance on the vibration performance of the outer suspended region 222. The damping holes 2221 collectively reduce the acoustic impedance and noise of the differential capacitor microphone, improving the overall performance of the MEMS microphone.

Optionally, the plurality of damping holes 2221 are centrally symmetrically distributed with respect to a center of the outer suspended region 222.

As shown in FIG. 4, since the gap between the outer suspended region 222 and the substrate 1 is small, it is necessary to design a perforation to reduce acoustic impedance and noise. Considering the convenience for processing, as shown in FIG. 2, the plurality of damping holes 2221 are provided to be centrally symmetrically distributed with respect to the center of the outer suspended region 22, so as to reduce processing difficulty and facilitate mass production. Moreover, by adopting a centrally symmetrical distribution, it is possible to improve the vibration consistency of the entire diaphragm 2, such that the inner suspended region 221 and outer suspended region 222 exhibit basically consistent deformation characteristics, thereby improving the signal-to-noise ratio of the microphone.

Optionally, the damping holes 2221 are arranged in one or more circles.

In the present embodiment, by arranging the damping holes 2221 in one or more circles to increase the density of the damping holes 2221 on the outer suspended region 222, it is possible to ensure low damping and thus reduce acoustic the impedance and noise. The solution that the damping holes 2221 are distributed in a plurality of circles is suitable to be implemented in cooperation with some technical features. For example, when the ratio of the diameter of the inner suspension region 221 to the diameter of the outer suspension region 222 is small, the area of the outer suspension region 222 is relatively large. By designing the damping holes 2221 arranged in two or more circles, it is possible to more effectively reduce the air damping on the outer suspended region 222. Or, for example, when the distance between the outer suspended region 222 and the substrate 1 is less than 2 μm, it is possible to adopt damping holes 2221 arranged in two or more circles so as to reduce the damping on the outer suspended region 222.

Optionally, the support 31 is a continuous annular structure; or, the support 31 comprises a plurality of protrusions 311 distributed at intervals.

In the present embodiment, the support 31 may be a continuous structure or a non-continuous structure. A continuous structure may be a circular, rectangular, or other annular structure; and a non-continuous structure may be a plurality of protrusions 311 distributed at intervals. According to actual design or production needs, the plurality of protrusions 311 may be distributed evenly or unevenly.

With the support function of the support 31, it is possible to significantly increase the hardness of the inner suspended region 221 and the outer suspended region 222, and improve the resonant frequency. By using the continuous annular structure as the support 31, it is possible to relatively increase the hardness of the suspended region more significantly, especially such that the resonance frequency of the inner suspended region 221 rises more significantly. By using the support 31 formed by the plurality of discontinuous protrusions 311, it is possible to better improve the overall vibration consistency of the suspended part 22. Moreover, when the suspended part 22 is impacted by a strong air flow, the support 31 may somehow help the suspended part 22 to release the air pressure, thereby reducing the risk of damage to the diaphragm 2.

Optionally, the support 31 comprises a plurality of protrusions 311, which are centrally symmetrically distributed with respect to a center of the suspended part 22.

In the present embodiment, considering the stability and processing difficulty of the support 31, the plurality of protrusions 311 are provided to be centrally symmetrically distributed with respect to the center of the suspended part 22, which also makes the mechanical vibration of the diaphragm 2 more uniform and consistent.

Figure 3:
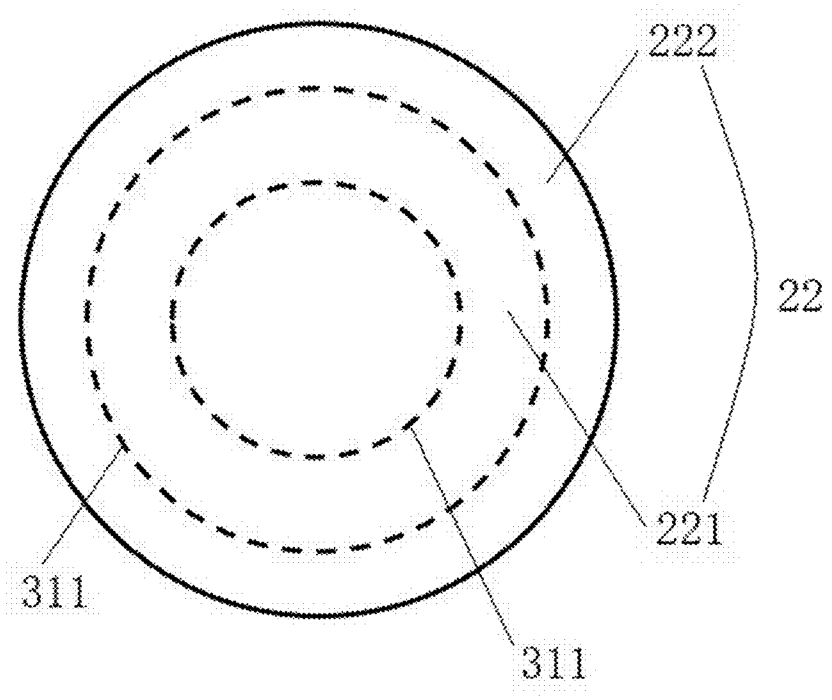
FIG. 3 is a top view of a MEMS microphone including two supports according to an embodiment of the present disclosure.

Optionally, the support 31 may form not only an annular structure in one circle, but also an annular structure in two circles so as to divide the suspended part 22 into three regions. As shown in FIG. 3, this implementation may adopt a diaphragm 2 with a larger size. This design may further increase the size of the diaphragm 2 on the one hand, and thus reduce acoustic impedance of the noise and improve the signal-to-noise ratio. The additional annular structure of one circle may keep sufficient rigidity of the suspended part 22 to meet the demands of the resonance frequency and the frequency response bandwidth. Wherein, the number of support 31 may be increased by using the plurality of supports 31 in the continuous structure, which are centrally symmetrically distributed with respect to the center of the suspended part 22, i.e., coaxially provided; or, increasing the number of protrusions 311, and increasing the density of the plurality of protrusions 311 that are centrally symmetrically distributed with respect to the center of the suspended part 22.

The following takes the technical solution of the support 31 forming the annular structure of one circle as an example to illustrate the specific features that may be adopted in this solution.

In the present embodiment, the suspended part 22 may be circular, rectangular, or other irregular shapes; the outer suspended region 222 may be circular, rectangular, or other irregular shapes; the inner suspended region 221 may be circular, rectangular, or other irregular shapes. When it is circular, its radial dimension is its diameter; when it is rectangular, its radial dimension is the length of its longer side; when it is of other irregular shapes, the radial dimension is the maximum length within it.

The inner suspended region 221 and the outer suspended region 222 may both be subjected to a bias voltage to form a capacitor with the backplate 3. By optimizing the radial dimensions of the inner suspended region 221 and the outer suspended region 22, the inner suspended region 221 and the outer suspended region 222 have similar or identical mechanical sensitivity (Sm) and critical voltage (Vp). In this way, during operation, the bias voltage between the back electrode of the backplate 3 (the back electrodes of the inner and outer suspended regions 222 may be interconnected) and the diaphragm 2 may ensure consistent displacement of the inner suspended region 221 and the outer suspended region 222, and the sound pressure signal acting on the entire diaphragm 2 also ensures consistent displacement of the inner suspended region 221 and the outer suspended region 222 such that the electrical signal (Vout=w/Gap*VB) is kept consistent, so as to reduce the acoustic resistance and its associated noise while enlarging the diaphragm 2, to reduce the loss of mechanical sensitivity due to parasitic capacitance (Cp) since the effective capacitance (Cm) is increased, to enhance the mechanical sensitivity Sm=(Sm·VB/Gap)·[Cm/(Cm+Cp)], and thus to improve the signal-to-noise ratio (SNR), thereby enhancing the overall performance of the MEMS microphone.

Optionally, a difference between mechanical sensitivity of the inner suspended region 221 and that of the outer suspended region 222 is less than or equal to 15%. When the mechanical sensitivity the inner and outer suspended regions conforms to the aforementioned characteristics, the vibratory effect expressed by the diaphragm 2 in the MEMS microphone may make the electrical signals generated by the diaphragm 2 basically consistent, and the two are relatively matched. By using the two electrical signals in the inner and outer suspended regions as sound signals or by combining the two as differential signals, it is possible to improve the acoustic effect as a whole. Preferably, the difference in mechanical sensitivity Sm is less than 10%, close to 5% and below 5%, such that the absolute values of the mechanical sensitivity Sm are the same. In this way, when the two electrical signals in the inner and outer suspended regions are used as differential capacitors and differential signals, it is possible to ensure the higher accuracy, and is less likely to cause distortion in sound signals.

Optionally, a difference between critical voltages Vp of the inner suspended region 221 and the outer suspended region 222 may be less than or equal to 15%. By controlling the applied bias voltage and potential, and by controlling the dimensions of the inner suspended region 221 and the outer suspended region 222, it is possible to minimize their difference in critical voltages Vp, and the two are relatively matched. When the critical voltages Vp of the inner and outer suspended regions conform to the above numerical range, they are more likely to exhibit similar or the same mechanical performance so as to ensure high consistency in the vibratory behavior of the diaphragm, thereby improving the acoustic performance. Preferably, the difference in critical voltages Vp is less than 10%, close to 7% or below 7%, such that the absolute values of the critical voltages Vp are the same. In this way, especially in the technical solution using the differential capacitors, it is possible to reduce the error of the two electrical signals and prevent abnormal distortion.

Optionally, the inner suspended region 221 and the outer suspended region 222 are circular in shape with radial dimensions thereof are diameters.

As shown in FIG. 2, the diameter of the inner suspended region 221 is D1, and the diameter of the outer suspended region 222 is D2. In this solution, the diameter of the inner suspended region 221 may range from 450 μm to 750 μm, and the diameter of the outer suspended region 222 may range from 650 μm to 1100 μm. The thickness of the diaphragm 2 ranges from 0.75 μm to 1.25 μm. By providing the above support 31 between the edge of the diaphragm 2 and the center of the diaphragm 2, it is possible to enlarge the radial dimension of the outer suspension region 222 accordingly while ensuring the mechanical strength of the diaphragm 2. That is to say, it is possible to enlarge the area of the diaphragm 2, reduce the acoustic resistance noise, and improve the signal-to-noise ratio, thereby improving the overall performance of the MEMS microphone.

Optionally, the inner suspended region 221 has a diameter of 500 μm; the outer suspended region 222 has a diameter of 750 μm; and the diaphragm 2 has a thickness of 1 μm.

Optionally, the mechanical sensitivity Sm of the inner suspended region 221 ranges from 2 nm/Pa to 9 nm/Pa. For example, the mechanical sensitivity Sm of the inner suspended region 221 is 2.25 nm/Pa.

In the present embodiment, the diameter of the inner suspended region 221 is preferably 500 μm or 700 μm, which may reduce the acoustic resistance noise and improve the signal-to-noise ratio by enlarging the area of the diaphragm 2 while ensuring that the diaphragm 2 has sufficient mechanical strength. For example, if the radial dimension of the inner suspended region 221 is 500 μm, the radial dimension of the outer suspended region 222 may be 750 μm. At this time, the mechanical sensitivity Sm of the inner suspended region 221 is approximately 2 nm/Pa to 3 nm/Pa, the size of the whole diaphragm also becomes larger, the sound noise may be reduced by 3 dB accordingly, and the resonant frequency fres of the diaphragm 2 itself is about 73 kHz.

Optionally, if the radial dimension of the inner suspended region 221 is 700 μm, the radial dimension of the outer suspended region 222 may be 900 μm. At this time, the mechanical sensitivity Sm of the inner suspended region 221 is approximately 9 nm/Pa, the size of the whole diaphragm also becomes larger, the sound noise may be reduced by 5 dB accordingly, and the resonant frequency fres of the diaphragm 2 itself is about 37 kHz.

The size design of the above two kinds of suspended part 22 may enable the sound resonance frequency of the suspended part 22 to reach more than 30 kHz in the actual operation, so as to achieve sufficient acoustic performance by using the free diaphragm of the simple support form.

Optionally, the support 31 is formed with a reinforcing layer 312. In actual operation, the support 31 needs to withstand the impact generated by the deformation of the diaphragm 2. In the present embodiment, by providing the reinforcing layer 312 on the support 31, it is possible to enhance the mechanical strength of the support 31. The reinforcing layer 312 may improve the overall consistency of the acoustic performance of the MEMS microphone and avoids changes in acoustic performance due to deformation or damage of the support 31.

Optionally, the reinforcing layer 312 is made of polysilicon. During the actual manufacture process, a layer of polysilicon may be provided on the backplate 3 to form an electrically charged base board. The deposition process of polysilicon usually uses LPCVD, which provides better structural strength and hardness. Therefore, in this solution, a reinforcing layer 312 may be formed on the surface of the support 31 using the process of forming a polysilicon layer, for coming into contact with the suspended part 22 of the diaphragm 2.

Particularly, in the technical solution where polysilicon is used as the reinforcing layer 312 and the backplate 3 is also realized using a polysilicon layer to achieve electrification, to avoid the capacitor failure caused by the electrical conduction between the polysilicon reinforcement layer 312 and the diaphragm 2, optionally, the polysilicon layer on the support 31 is isolated from the polysilicon layer on the surface and/or inside the backplate 3. This isolation may be directly achieved through physical isolation, for example, by etching to eliminate the position of the polysilicon layer on the support 31 near the backplate 3. Subsequently, insulating materials such as silicon nitride and silicon oxide may be further deposited in the trenches.

Optionally, when the backplate 3 and/or the diaphragm 2 is energized, the suspended part 22 is spaced apart from the substrate 1 by at least 2 μm in the vibration direction of the suspended part 22, so as to improve the vibration expression of the outer suspended region 222.

In the present embodiment, when either the backplate 3 or the diaphragm 2 is energized, or when both the backplate 3 and the diaphragm 2 are energized, the suspended part 22 may produce mechanical vibration under sound pressure, so as to ensure that the suspended part 22 always maintains a separation of at least 2 μm (i.e., the H indicated in FIG. 4) from the substrate 1 in the vibration direction of the suspended part 22, which gives the diaphragm 2 sufficient vibration space, improves the mechanical sensitivity of the diaphragm 2, enhances its range of response to sound, and also improves the overall performance of the MEMS microphone.

For the relationship between the inner suspended region 221 and the acoustic cavity 001 in this technical solution, optionally, the inner suspended region 221 corresponds to a position of the acoustic cavity 001. The opening size of the acoustic cavity 001 is relatively small, while the outer suspended region 222 corresponds to a position of the substrate 1 below, as shown in FIG. 4. This implementation, on the one hand, relatively reduces the opening size of the acoustic cavity 001, which reduces the possibility of the diaphragm 2 being damaged by the impact of air flow, and also reduces the possibility of foreign matter affecting the acoustic cavity 001, thereby improving the stability and reliability of the microphone. On the other hand, the reason why this technical solution may adopt this technical feature is that the inner suspended region 221 and the outer suspended region 222 form a simple support through the support 31. The inner suspended region 221 impacted by sound pressure may transfer the vibration effect to the outer suspended region 222 through the support 31, and the outer suspended region 222 may vibrate without needing to be directly subjected to air vibration, thereby achieving the conversion of electrical signals. This technical solution cleverly utilizes the characteristics of simple support formed between the diaphragm 2 and the support 31, and thus improves the impact resistance of the microphone without affecting the conversion of differential signal.

Additionally, it is also possible that the inner suspended region 221 is located above a sound input channel and the outer suspended region 222 is located outside the sound input channel. Wherein, the sound input channel is a channel provided within the acoustic cavity 001 for allowing sound to enter. That is, there is a sound input channel within the acoustic cavity 001, the inner suspended region 221 is located above the sound input channel, and the outer suspended region 222 is located outside the sound input channel, which allows sound pressure to enter from the sound input channel and only act directly on the inner suspended region 221 to excite the inner suspended region 221 to vibrate mechanically, while the outer suspended region 222 is not directly acted upon by sound pressure. However, due to the presence of the support 31, the inner suspended region 221 impacted by sound pressure may transfer the vibration effect to the outer suspended region 222 through the support 31, and the outer suspended region 222 may vibrate without needing to be directly subjected to air vibration, thereby achieving the conversion of electrical signals.

According to another aspect of the present disclosure, a microphone unit is provided. The microphone unit comprises a housing, a chip, and a MEMS microphone as described above, both the chip and the MEMS microphone are located within the housing, and the chip is electrically connected to the MEMS microphone.

In the present embodiment, the microphone unit comprises the housing, the chip and the above MEMS microphone located inside the housing. The chip is electrically connected to the MEMS microphone for supplying power to the MEMS microphone, so that the capacitor may be formed inside the MEMS microphone.

According to yet another aspect of the present disclosure, an electronic device is provided. The electronic device comprises a MEMS microphone as described above, which is provided to convert sound signals into electrical signals during operation.

In the present embodiment, when the electronic device is operating, the internal microphone unit may receive sound signals from the user and complete the conversion from the sound signals into the electrical signals. The electronic device may be a mobile phone, television, computer, smartwatch, and so on.

Optionally, the MEMS microphone provided in this solution may be prepared by a semiconductor vapor deposition method. The preparation method may mainly comprise the following steps:

Firstly, silicon is used as the substrate 1, and a layer of silicon dioxide is deposited on the substrate 1, followed by selective masking and etching. Secondly, the first low-stress polycrystalline silicon is deposited, doped, and annealed to obtain the diaphragm 2. Thirdly, a sacrificial layer is deposited on the diaphragm 2, and may be low-temperature deposited silicon oxide, silicon nitride, etc. And, trenches are formed by etching the sacrificial layer for further deposition of materials. Fourthly, a polycrystalline silicon layer is deposited on the sacrificial layer through a high-temperature deposition process. A portion of the polycrystalline silicon layer may serve as the conductive area of the backplate 3, and the polycrystalline silicon layer deposited in the trenches of the sacrificial layer located at the edge of the diaphragm 2 may be used as a conductive point for connecting the diaphragm 2 and the backplate 3 to different electrodes, respectively, while the polycrystalline silicon layer deposited in the trenches of the sacrificial layer located in the central region (the suspended part 22) of the diaphragm 2 may be used as the reinforcing layer 312 of the support 31.

The polycrystalline silicon layer deposited in the sacrificial layer trench located in the central region (suspended part 22) of the diaphragm 2 can be used as the reinforcing layer 312 of the support 31.

Through the etching process, the polycrystalline silicon layer used for electrical connection, for the reinforcing layer 312, and for the backplate 3 cannot be electrically conducted, so as to prevent the reinforcing layer 312 and the diaphragm 2 from being short-circuited, to prevent the back plate 3 and the diaphragm 2 from being short-circuited, and the like.

Fifthly, further deposition on the polycrystalline silicon layer is used to form the structural layer of the backplate 3, which may be formed using a low-temperature silicon nitride deposition process. That is, the backplate 3 may be formed with a combined layered structure of silicon nitride and polycrystalline silicon.

Sixthly, further trenches are etched on the backplate material and materials such as chromium, nickel, and aluminum are deposited in them to act as welding points 4. Optionally, two welding points 4 may be provided above the backplate material, and may be respectively used to electrically connect to the diaphragm 2 and the backplate 3. In other implementations, more welding points 4 may be deposited to connect to different regions of the backplate 3 or the diaphragm 2.

The above embodiments focus on the differences between the various embodiments, and the different optimization features between the various embodiments, as long as they do not contradict each other, may be combined to form a better embodiment, which will not be repeated herein taking into account the brevity of the text.

Although some specific embodiments of the present disclosure have been described in detail through examples, those skilled in the art should understand that the above examples are for illustration only and are not intended to limit the scope of the present disclosure. Those skilled in the art should understand that the above embodiments can be modified without departing from the scope and spirit of the present disclosure. The scope of the present disclosure is defined by the accompanying claims.

The invention claimed is:

1. A MEMS (Micro-Electro-Mechanical System) microphone, comprising:

a substrate, on which an acoustic cavity is formed;

a diaphragm having a fixed part which is fixed on the substrate, and a suspended part which is located above the acoustic cavity; and a backplate provided on the substrate, with a gap formed between the backplate and the diaphragm, and the backplate being provided with a support distributed annularly thereon, and the support extending toward the diaphragm, corresponding to a position of the suspended part and dividing the suspended part into an inner suspended region and an outer suspended region;

wherein when the backplate and/or the diaphragm is energized, the suspended part is configured to abut against the support such that the inner suspended region is excited by sound pressure to vibrate mechanically, and the inner suspended region surrounds the support to drive the outer suspended region to vibrate, wherein a vibration direction of the inner suspended region is opposite to that of the outer suspended region;

the diaphragm and the backplate form a capacitive structure which is divided into an inner capacitor and an outer capacitor by the support.

2. The MEMS microphone according to claim 1, wherein the inner capacitor and the outer capacitor have matched capacitance values.

3. The MEMS microphone according to claim 1, wherein a difference between absolute capacitance values of the inner capacitor and the outer capacitor is less than or equal to 15%.

4. The MEMS microphone according to claim 1, wherein the outer suspended region is provided with a plurality of damping holes.

5. The MEMS microphone according to claim 1, wherein the inner suspended region has a diameter of 500 μm;

the outer suspended region has a diameter of 750 μm; and the diaphragm has a thickness of 1 μm.

6. The MEMS microphone according to claim 4, wherein the damping holes are arranged in one or more circles.

7. The MEMS microphone according to claim 1, wherein the diaphragm is configured to be connected to a bias voltage terminal;

a first back-electrode region is configured to be connected to a first potential point, a second back-electrode region is configured to be connected to a second potential point, the first potential point and the second potential point having the same absolute value of potential, and the inner suspended region having a mechanical sensitivity and a critical voltage that are correspondingly matched to those of the outer suspended region.

8. The MEMS microphone according to claim 1, wherein a mechanical sensitivity difference between the inner suspended region and the outer suspended region is less than or equal to 15%; and a critical voltage difference between the inner suspended region and the outer suspended region is less than or equal to 15%.

9. The MEMS microphone according to claim 1, wherein when the backplate and/or the diaphragm is energized, the suspended part is spaced apart from the substrate by at least 2 μm in a vibration direction of the suspended part.

10. The MEMS microphone according to claim 1, wherein the support comprises a continuous annular structure; or the support comprises a plurality of protrusions distributed at intervals.

11. The MEMS microphone according to claim 1, wherein the support comprises a plurality of protrusions, which are centrally symmetrically distributed with respect to a center of the suspended part.

12. The MEMS microphone according to claim 1, wherein the inner suspended region and the outer suspended region are circular in shape with radial dimensions being diameters.

13. The MEMS microphone according to claim 1, wherein the inner suspended region has a diameter ranging from 450 μm to 750 μm;

the outer suspended region has a diameter ranging from 650 μm to 1100 μm; and the diaphragm has a thickness ranging from 0.75 μm to 1.25 μm.

14. The MEMS microphone according to claim 5, wherein the plurality of damping holes are centrally symmetrically distributed with respect to a center of the outer suspended region.

15. An electronic device, comprising a MEMS microphone according to claim 1, wherein the MEMS microphone is configured for converting a sound signal into an electrical signal in operation.

16. A MEMS (Micro-Electro-Mechanical System) microphone, comprising:

a substrate, on which an acoustic cavity is formed;

a backplate provided on the substrate and provided with a protruding support distributed annularly thereon;

a diaphragm having a fixed part which is fixed on the substrate, and a suspended part, a gap between the backplate and the diaphragm, and the support dividing the suspended part into an inner suspended region located above a sound input channel and an outer suspended region located outside the sound input channel;

when the backplate and/or the diaphragm is energized, the suspended part is configured to abut against the support such that the inner suspended region is excited by sound pressure to vibrate mechanically.

* * * * *